(12) United States Patent
Seefeld et al.

(10) Patent No.: US 8,489,641 B1
(45) Date of Patent: Jul. 16, 2013

(54) DISPLAYING LAYERS OF SEARCH RESULTS ON A MAP

(75) Inventors: Bernhard A. M. Seefeld, New York, NY (US); Neal Kanodia, Mountain View, CA (US); Elizabeth M. Windram, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/179,459

(22) Filed: Jul. 8, 2011

Related U.S. Application Data

(60) Provisional application No. 61/362,552, filed on Jul. 8, 2010.

(51) Int. Cl.
G06F 7/00 (2006.01)
G06F 17/30 (2006.01)

(52) U.S. Cl.
USPC ............................. 707/792; 715/788; 715/790

(58) Field of Classification Search
USPC ... 707/792; 715/716, 763, 781, 788; 701/32.4
See application file for complete search history.

(56) References Cited

U.S. PATENT DOCUMENTS

| | | | |
|---|---|---|---|
| 7,376,516 B2 | 5/2008 | Jones | |
| 7,395,140 B2 | 7/2008 | Christie et al. | |
| 8,015,183 B2 * | 9/2011 | Frank | 707/724 |
| 2003/0074358 A1 * | 4/2003 | Sarbaz et al. | 707/10 |
| 2004/0225647 A1 * | 11/2004 | Connelly et al. | 707/3 |
| 2004/0259573 A1 * | 12/2004 | Cheng | 455/456.3 |
| 2005/0278378 A1 * | 12/2005 | Frank | 707/104.1 |
| 2006/0271277 A1 * | 11/2006 | Hu et al. | 701/202 |
| 2007/0118520 A1 * | 5/2007 | Bliss et al. | 707/5 |
| 2008/0059889 A1 * | 3/2008 | Parker et al. | 715/748 |
| 2008/0256444 A1 * | 10/2008 | Wang et al. | 715/700 |
| 2008/0298342 A1 * | 12/2008 | Appleton et al. | 370/351 |
| 2008/0301643 A1 * | 12/2008 | Appleton et al. | 717/124 |
| 2009/0282353 A1 * | 11/2009 | Halbherr et al. | 715/769 |
| 2010/0057337 A1 * | 3/2010 | Fuchs | 701/200 |
| 2010/0057562 A1 * | 3/2010 | Gabbay | 705/14.52 |
| 2010/0298050 A1 * | 11/2010 | Taraschuk et al. | 463/31 |
| 2011/0106534 A1 * | 5/2011 | LeBeau et al. | 704/235 |
| 2011/0161875 A1 * | 6/2011 | Kankainen | 715/810 |
| 2012/0022781 A1 * | 1/2012 | Wilson | 701/410 |

OTHER PUBLICATIONS

Wikipedia. "Geographic Information System." [Retrieved on Jul. 7, 2010] Retrieved from the Internet <URL: http://en.wikipedia.org/w/index.php?title=Geographic_information_syst . . . > 20 pages.
Wikipedia. "Google Maps." [Retrieved on Jul. 7, 2010] Retrieved from the Internet <URL: http://en.wikipedia.org/w/index.php?title=Google_Maps&printable=yes= 17 pages.

* cited by examiner

*Primary Examiner* — Robert Beausoliel, Jr.
*Assistant Examiner* — Nicholas Allen
(74) *Attorney, Agent, or Firm* — Marshall, Gerstein & Borun LLP

(57) ABSTRACT

In general, the subject matter described in this specification can be embodied in methods, systems, and program products. Information that is responsive to each of multiple distinct search queries is received from a server system. The information for each of the search queries identifies a geographical context or includes search results. One or more visual indications of the information for each of the search queries are displayed on a geographical map. A user interface element for each of the search queries is displayed. The user interface element for each of the search queries, when selected by a user, causes removal from the display of the one or more visual indications of the information for the search query that corresponds to the selected user interface element.

20 Claims, 9 Drawing Sheets

Interactions Between Search Query Layers

| Focused Search Query Layer | Action |
|---|---|
| 502<br><br>Gas Station | Emphasize Gas Station Search Results Around Layers that are Visible (e.g., Driving Route and Union Square) |
| 504<br><br>Pizza | Emphasize Pizza Search Results Around Layers that are Visible (e.g., Driving Route and Union Square) |
| 506<br><br>Driving Route | Emphasize Search Results (e.g., Pizza and Gas Station Search Results) Around Driving Route |
| 508<br><br>Union Square | Emphasize Search Results (e.g., Pizza and Gas Station Search Results) Around Union Route |

FIG. 5A

DISPLAYING LAYERS OF SEARCH RESULTS ON A MAP

CROSS-REFERENCE TO RELATED APPLICATION

This application claims priority to U.S. Provisional Application Ser. No. 61/362,552, filed on Jul. 8, 2010, entitled "Displaying Layers of Search Results on a Map," the entire contents of which are hereby incorporated by reference

TECHNICAL FIELD

This specification relates to digital data processing, and more particularly to presenting search results with a geographic map.

BACKGROUND

Individuals can use computers to access mapping websites over the internet. The mapping websites provide interactive maps for display on the individuals' computers. Individuals can move the maps, zoom-in on regions of the maps, and view traffic information on the maps. Further, users can submit search queries and, in response, view icons that are placed on the maps at locations of businesses that are responsive to the search queries.

SUMMARY

This document describes techniques, methods, systems, and mechanisms for displaying layers of search results on a map. In general, a user of a computing device can submit multiple search queries to a mapping service. In response to each of the queries, the mapping service can provide information to the computing device for displaying a layer of visual indicators, where the visual indicators can represent search results or geographical contexts. The multiple layers of visual indicators can be overlaid on a display of a map.

A set of graphical user interface elements for manipulating the display of the layers can accompany the display of the map. For example, each particular layer can be associated with a first graphical interface element for toggling a visibility of the visual indicators for the particular layer. Additionally, each particular layer can be associated with a second graphical interface element that provides focus to the particular layer. A layer that has focus can interact with other layers differently than when the layer does not have focus.

For example, providing focus to a layer that defines a geographical context can cause search results, from other layers, that are determined to be associated with the focused geographical context to appear emphasized in the display or alone as the only search results in the display. Providing focus to a layer that identifies search results can cause those search results from the focused layer that are associated with geographical contexts of other visible layers to appear emphasized or alone as the only search results in the display.

In general, one aspect of the subject matter described in this specification can be embodied in one or more computer-readable storage devices storing instructions that, when executed by one or more processing devices, cause a computing system to perform operations. The operations include receiving, from a server system, information that is responsive to each of multiple distinct search queries, wherein the information for each of the search queries identifies a geographical context or includes search results. The operations include displaying, on a geographical map, one or more visual indications of the information for each of the search queries. The operations include displaying a user interface element for each of the search queries, wherein the user interface element for each of the search queries, when selected by a user, causes removal from the display of the one or more visual indications of the information for the search query that corresponds to the selected user interface element.

Additional aspects can optionally include one or more of the following features. The operations can further comprise receiving from the server system an identification of a first geographical context that has been determined based on content in a first of the search queries, and second search results that have been determined to be responsive to a second of the search queries. The operations can further comprise displaying on the geographical map a visual indication of the first geographical context, and visual indications of a first portion of the second search results that have been determined to be geographically relevant to the first geographical context. The first geographical context may be a route between a starting position and an ending position.

The operations can further comprise displaying on the geographical map a visually different style of visual indications of another portion of the second search results that have not been determined to be geographically relevant to the first geographical context. The operations can further comprise receiving user selection of a first user interface element that corresponds to the first search query; and adding to the display, as a consequence of the user selection of the first user interface element, visual indications of a second portion of the second search results. The operations can further comprise receiving, after the user selection of the first user interface element, another user selection of the first user interface element; and removing from the display, as a consequence of the another user selection of the first user interface element, the visual indications of the second portion of the second search results.

The operations can further comprise receiving, from the server system, an identification of a third geographical context that is determined based on content in a third of the search queries; receiving user selection of a third user interface element that corresponds to the third search query; removing from the display, as a consequence of the user selection of the third user interface element, at least some of the visual indications of the first portion of the second search results; and adding to the display, as a consequence of the user selection of the third user interface element, visual indications of a second portion of the second search results that have been determined to be geographically relevant to the third geographical context. The operations can further comprise receiving, from the server system, an identification of a third geographical context that is based on content in a third of the search queries; and displaying, on the geographical map, visual indications of a second portion of the second search results that have been determined to be geographically relevant to the third geographical context. Visual indications of a third portion of the third search results are not displayed, the third portion of the third search results not having been determined to be geographically relevant to the first geographical context and not having been determined to be geographically relevant to the second geographical context.

The operations can further comprise receiving, from the server system, fourth search results that are responsive to a fourth of the search queries; receiving user selection of a user interface element that corresponds to the fourth search query; and adding to the display, as a consequence of receiving user selection of the fourth user interface element, visual indications of a first portion of the fourth search results that have been determined to be geographically relevant to the first geographical context, and visual indications of a second portion of the fourth search results that have been determined to be geographically relevant to the second geographical context.

Other aspects of the subject matter described in this specification can include a method that performs the operations according to the above-described operations, or a system that includes the above-described one or more processing devices and the above-described one or more computer-readable storage devices.

Another aspect of the subject matter described in this specification can be embodied in a computer-implemented method for displaying search results on a map. The method includes receiving, by a server system, multiple distinct search queries that were submitted from a computing device. The method includes providing, by the server system and for receipt by the computing device, information to cause the computing device to display on a geographical map a layer of one or more visual indications for each of the search queries, each layer to include a visual indication of a geographical context that is responsive to a respective search query or visual indications of search results that are responsive to the respective search query. The method includes providing, by the server system and for receipt by the computing device, information to cause the computing device to display a user interface element for each of the displayed layers, each user interface element being for causing the computing device to remove, upon user selection of the respective user interface element, the display of the layer of one or more visual indications for the search query that corresponds to the selected user interface element.

Additional aspects can optionally include one or more of the following features. The method can include providing, by the server system and for receipt by the computing device, information to cause the computing device to display on the geographical map (a) a visual indication of a first geographical context that has been determined based on content in a first of the search queries, and (b) visual indications of a first portion of second search results that have been determined to be geographically relevant to the first geographical context, the second search results having been determined to be responsive to a second of the search queries.

The method can include providing, by the server system and for receipt by the computing device, information for causing the computing device to display on the geographical map a visually different style of visual indications of another portion of the second search results that have not been determined to be geographically relevant to the first geographical context. The method can include providing, by the server system and for receipt by the computing device, information for causing the computing device to add to the display of the geographical map, as a consequence of the computing device receiving user selection of a first user interface element that corresponds to the first search query, visual indications of a second portion of the second search results, and remove from the display of the geographical map, as a consequence of the computing device receiving another user selection of the first user interface element, the visual indications of the second portion of the second search results.

Other aspects of the subject matter described in this specification can include corresponding computer-readable storage devices storing instructions that, when executed by one or more processing devices, perform operations according to the above-described methods. Other embodiments may include systems and apparatus that include the described computer-readable storage devices and that are configured to execute the operations using one or more processing devices.

Another set of aspects of the subject matter described in this specification are described below.

In general, one aspect of the subject matter described in this specification can be embodied in a computer-implemented method of displaying search results on a map. The method includes receiving, by a computing device, user input submitting multiple distinct search queries, and providing the search queries to a server system that is remote from the computing device. The method includes receiving, by the computing device and from the server system for each particular search query of the search queries, information that is responsive to the particular search query. The information for the particular search query (i) identifies a geographical context, or (ii) includes search results. The method includes displaying for each particular search query, by the computing device and on a geographical map, one or more visual indications of the information for the particular search query. The method includes displaying, by the computing device and for each of at least two of the search queries, a user interface element that corresponds to the search query and that, when selected by a user, causes the computing device to remove the display of the one or more visual indications of the information that corresponds to the selected user interface element.

Another aspect of the subject matter described in this specification can be embodied in a computer-implemented method for displaying search results on a map. The method includes receiving, by a server system and from a computing device that is remote to the server system, multiple distinct search queries that were submitted by a user of the computing device. The method includes providing, by the server system and to the computing device for each particular search query of the search queries, information that is responsive to the particular search query. The information for the particular search query (i) identifies a geographical context, or (ii) includes search results, so as to cause the computing device to: display on a geographical map for each particular search query, one or more visual indications of the information for the particular search query, and display for each of at least two of the search queries, a user interface element that, when selected by a user, causes the computing device to remove the display of the one or more visual indications of the information that corresponds to the selected user interface element.

In yet another aspect, the subject matter described in this specification can be embodied in a system for displaying search results on a map. The system includes a mobile device. The mobile device is configured to receive user input submitting multiple distinct search queries. The mobile device is configured to provide the search queries to a server system. The mobile device is configured to receive from the server system determined information that is responsive to each particular search query of the search queries. The information for the particular search query (i) identifies a geographical context, or (ii) includes of search results. The mobile device is configured to display on a geographical map for each particular search query, one or more visual indications of the information for the particular search query. The mobile device is configured to display for each of at least two of the search queries, a user interface element that, when selected by a user, causes the computing device to remove the display of the one or more visual indications of the information that corresponds to the selected user interface element. The mobile device is configured to provide a display of a map of each of the layers and graphical interface elements for toggling a display of each layer on or off, and for clustering search results around one or more geographical positions.

The system includes a server system. The server system is configured to receive the search queries from the mobile device. The server system is configured to determine, for each particular search query of the search queries the information that is responsive to the particular search query. The determined information for the particular search query (i) identifies a geographical context, or (ii) includes search results. The server system is configured to provide to the computing device for each particular search query, the determined information.

These and other implementations can optionally include one or more of the following features. Each particular search query may be input by a user using a keyboard. Each particular search query may be input by a user using a voice input device that includes a microphone. The computing device may receive from the server system an identification of a first geographical context that the server system has determined based on content in a first of the search queries. The first geographical context is a first route between a starting position and an ending position. The computing device may receive from the server system second search results that the server system has determined are responsive to a second of the queries. The computing device may display on the geographical map a visual indication of the first route between the first position and the second position, and visual indications of a portion of the second search results that have been determined to be geographically relevant to the first route. The computing device may display on the geographical map a visually different style of visual indications of a portion of the second search results that have not been determined to be geographically relevant to the first route.

First user selection of a first user interface element that corresponds to the first search query may be received. In response to the first user selection, the visual indication of the first route may be removed from display. In response to the first user selection, visual indications of additional second search results that are not included in the portion of the second search results may be displayed. Second user selection of the first user interface element may be received. In response to the second-user selection, the visual indication of the first route may be re-displayed. In response to the second user selection, the visual indications of the additional second search results may be removed from display.

The computing device may receive from the server system an identification of a first geographical context that the server system has determined based on content in a first of the queries. The computing device may receive from the server system an identification of a second geographical context that the server system has determined based on content in a second of the search queries. The computing device may receive from the server system third search results that the server system has determined are responsive to a third of the queries. The computing device may receive from the server system fourth search results that the server system has determined are responsive to a fourth of the queries.

User selection of a first interface element that corresponds to the first query may be received. In response to the user selection of the first interface element, visual indications of a first portion of the third search results that have been determined to be geographically relevant to the first geographical context may be displayed on the map. In response to the user selection of the first interface element, visual indications of a first portion of the fourth search results that have been determined to be geographically relevant to the first geographical context may be displayed on the map.

The first geographical context may not be identified based on content in the third search query or the fourth search query. User selection of a second interface element that corresponds to the second query may be received. In response to the user selection of the second interface element, visual indications of a second portion of the third search results that have been determined to be geographically relevant to the second geographical context may be displayed. In response to the user selection of the second interface element, visual indications of a second portion of the fourth search results that have been determined to be geographically relevant to the second geographical context may be displayed.

The display of the visual indications of the first portion of the third search results and the display of the visual indications of the first portion of the fourth search results may be removed from the map an in response to the user selection of the second interface element. User selection of a third interface element that corresponds to the third query may be received. In response to the user selection of the third interface element, visual indications of a first portion of the third search results that have been determined to be geographically relevant to first geographical context may be displayed. In response to the user selection of the third interface element, visual indications of a second portion of the third search results that have been determined to be geographically relevant to the second geographical context may be displayed. A third portion of the third search results may not be displayed. The third portion of the third search results may not include any of the first portion or second portion of the third search results.

The first geographical context may not be determined based on content in the third search query or the fourth search query. The third portion of the third search results may not be determined to be geographically relevant to the first geographical context and may not be determined to be geographically relevant to the second geographical context. User selection of a fourth interface element that corresponds to the fourth query may be received. In response to the user selection of the fourth interface element, visual indications of a first portion of the fourth search results that have been determined to be geographically relevant to the first geographical context may be displayed. In response to the user selection of the fourth interface element, visual indications of a second portion of the fourth search results that have been determined to be geographically relevant to the second geographical context may be displayed. A third portion of the fourth search results is not displayed.

In response to the user selection of the fourth interface element, the visual indications of the first portion of the third search results and the visual indications of the second portion of the third search results may be removed from display. The visual indications that are displayed on the map in response to the user selection of the third interface element may be displayed without receipt of user-input at the computing device subsequent to the user selection of the third interface element. The visual indications that are displayed on the map in response to the user selection of the fourth interface element may be displayed without receipt of user-input at the computing device subsequent to the user selection of the fourth interface element.

Particular embodiments can be implemented, in certain instances, to realize one or more of the following advantages. A user can view multiple layers of search results in a single display of a map. The display of search results and visual indicators of geographical context can be toggled on and off. Applying multiple contexts to a set of search results can allow comparisons between the search results that are emphasized for each context. Applying multiple sets of search results to a single context can allow comparisons between the sets of search results that are emphasized for the single context.

The details of one or more embodiments are set forth in the accompanying drawings and the description below. Other features, objects, and advantages will be apparent from the description and drawings, and from the claims.

DESCRIPTION OF DRAWINGS

FIG. 5A is a chart illustrating example interactions between search query layers.

Like reference symbols in the various drawings indicate like elements.

DETAILED DESCRIPTION

Figure 1:
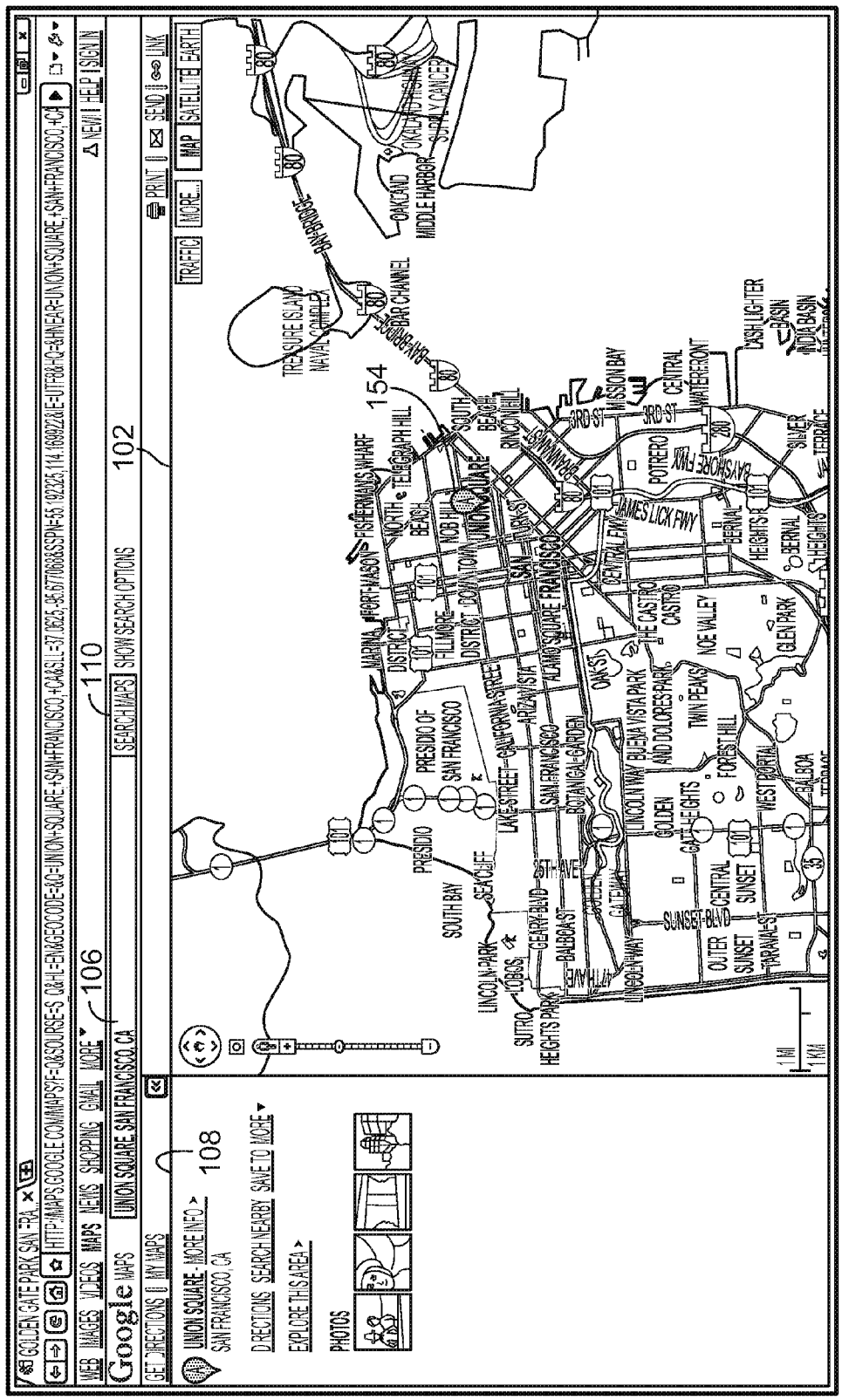
FIG. 1 is a screenshot of an example mapping webpage provided in response to the query "Union Square."

This document generally describes displaying layers of search results on a map. A user of an internet web mapping service can submit to the web mapping service a series of queries that include content related to various geographic locations, business, and services. Visual identifiers of search results or geographical locations that the mapping service has determined are responsive to the search queries can be successively layered on a map for display to the user. The user can interact with user interface controls that accompany the display of the map in order to remove layers that correspond to specific queries. Also, the user can interact with user interface controls to modify interactions between the layers of the map.

For example, a user can submit a first query that identifies a particular shopping mall, a second query that requests driving directions from the user's house to his friend's house, a third query that requests the locations of gas stations, and a fourth query that requests the locations of bike shops. In response to submitting the queries, a map can be presented on a display of a computing device, where the map includes visual identifiers of information that is responsive to each of the search queries. For example, a blue icon can appear at a location of the mall, a green line can appear along a route from the user's house to his friend's house, purple icons can appear at locations of gas stations, and yellow icons can appear at locations of bike shops.

Each visual representation of information for a particular search query can be conceptually understood to be a "layer" that is overlaid the map. The webpage that is displayed to the user can include, for each submitted search query, a graphical interface element for "turning on" and "turning off" the corresponding layer of information. For example, the user can turn off the "bike shop" layer in order to view just the mall icon, the route line, and the gas station icons. The user can later turn the bike shop layer back on using the same or a different graphical interface element.

Some of the search queries can allow a determination of a geographical context. A geographical context can be a specific location (e.g., geographical coordinates), range of locations (e.g., a series of locations that represents a route), or region (e.g., a region that is bounded by a city boundary). The geographical context can be determined based on user-supplied content of a query.

For example, a query that identifies a starting street address and an ending street address can be determined by a server system to identify a geographical context that is a route between the two addresses. A query that identifies a city name can be determined by the server system to identify a geographical context that is a region corresponding to the city, or a specific location at a downtown region of the city. A query that includes a name of a particular mall can be determined by a server system to identify a geographical context that is a location of the mall.

Search queries from which a context can be determined can be referred to as unambiguous search results. In some examples, search queries are considered unambiguous search results when a single context can be determined from the content of the search query. For example, a search query for a department store can not be considered unambiguous because the search can return the locations of multiple department stores.

The determination of whether a search query is associated with a single context can be determined based on how many visual indicators are displayed or to be displayed on a map for the query. For example, a server system can determine that multiple geographical contexts can be associated with the search query "City of Burlington." The server system, however, can determine that a single of the geographical contexts is relevant to a user of the computing device (e.g., based on a popularity of a particular city, a user history of viewing information about the city, a presently-viewed or based on a user-supplied disambiguation for the city).

An indication of the single geographical context can be provided to the user's computing device, and a single visual indication of the geographical context can be displayed to the user. Thus, even though multiple geographical contexts can be determined to be associated with a search query, a single one of the geographical contexts may be provided for display to the user in response to the query.

On the other hand, some search results can not be associated with a particular geographical context. For example, there are many gas stations around the world, and thus a search query for "gas stations" can not identify a particular geographical context to which the query should apply. In other words, the server system can not determine a single gas station to which the user of the computing device is interested in. Such search queries can be referred to as "ambiguous" search queries. Thus, search results for the "gas station" query can be provided to the computing device based on a context that was not defined by the user input query "gas station." The context can be a default context that is a "home" location of the user, or a current view of a map.

A user can provide a series of search queries to a mapping service, where some of the queries are ambiguous search queries and some of the search queries are unambiguous search queries. The user can select graphical interface elements to further refine the context that is applied to ambiguous search queries. For example, the user can use the graphical interface elements to selectively apply geographical contexts from the unambiguous queries to the ambiguous queries.

A user can provide focus to a search query layer that is unambiguous, and thus has a specific geographical context, so that ambiguous search results from other search query layers that are geographically near the context can be emphasized. Referencing the above example, the user can select a graphical interface element that corresponds to the driving route in order to cause the map to emphasize icons for gas stations and bike shops that are along the driving route. In response to selection of the graphical interface element, icons for gas stations and bike shops that are not near the driving route but are within the displayed region for the map can be removed from display, or can be displayed with a different shade, size, or style. Similarly, the user can select a graphical interface element that corresponds to the mall search query in order to cause the map to emphasize icons for gas stations and bike shops that are located near the mall. The icons that were previously emphasized as being along the driving route can disappear or be deemphasized.

In another example, the user can provide focus to a search query layer that is ambiguous and thus does not have a specific geographical context. Providing focus to the ambiguous search query layer can cause the map to emphasize icons for search results of the focused layer that are near a geographical context of other, unambiguous layers. For example, a user can select a graphical interface element that corresponds to the bike shop query in order to provide focus to the bike shop query layer. In response, the map can remove from display or deemphasize those icons that are for bike shop search results that are not near the mall or that are not along the driving route. Should the user "hide" one of the search query layers that is unambiguous (e.g., the "mall" layer), the mall icon can disappear and the icons for bike shops that are near the mall can disappear from display or be deemphasized.

In various examples, submission by a user of a new query, and thus addition of a new query layer to the map, can cause a visibility of one or more query layers for previously submitted queries to "turn off." For example, if a user submits two ambiguous queries in a row, the visibility of the query layer for the first ambiguous query can automatically "turn off" in response to displaying a query layer for the second ambiguous query. On the other hand, if an ambiguous query is submitted after an unambiguous query, the query layer for the ambiguous query can be displayed along with the query layer for the unambiguous query. Indeed, the unambiguous query can provide a geographical context for the ambiguous query.

As an illustration, a query for "gas station" can follow a query for "pizza." In response to submission of the "gas station" query, the search results that were displayed on the map for the "pizza" query can be removed from display on the map. On the other hand, the query "gas station" can follow a query for "111 8th ave nyc." In response to submission of the "gas station" query, one or more graphical interface elements for the "111 8th ave nyc" query can remain on the map, because "111 8th ave nyc" can be determined to be an unambiguous query. In various examples, a visibility of a first of two unambiguous queries can turn off in response to receipt of the second unambiguous query. In various examples, all other query layers of a same type (i.e., unambiguous or ambiguous) of a most-recently received query are turned off in response to receiving the most-recently received query.

In various examples, an unambiguous layer can include user-defined content. For example, a user can submit user input that causes a layer of "favorited" pins to appear for display on the map. The user can have identified, on various map displays over the last few months, the user's favorite places by selecting "stars" on search results that the user likes. Thus, the user can display a layer of these favorited placed on the map. The favorited places can each supply a geographical context.

Similarly, a user can create a layer of user-defined places or regions, for example, by dropping pins on a map, placing user defined lines and shapes on a map, or modifying a driving directions route and saving the route. Each of the user-defined places or regions can supply a geographical context. Thus, when a user has entered a search query for an unambiguous query (e.g., "Pizza"), the user can submit user input to render visible a layer of such user-defined places or regions so that the "Pizza" places that are near the user-defined places or regions are emphasized on the display or appear in distinction to "Pizza" places that are not near the user-defined places or regions.

In various examples, a query layer for an unambiguous query can influence a content of a query layer for another unambiguous query. Such an influence can occur when the second unambiguous query is associated with a geographical context, but can be modified. For example, a first query layer can specify several blocks and closed streets in a city where a festival is taking place. A second query for driving directions can be submitted. The determined route for the driving directions can be modified based on the festival query layer (e.g., to either avoid the festival or route through the festival). Thus, a user can save query layers for various events and road closures, and can selectively apply the query layers to a driving route to see how the driving route is impacted by the events and road closures.

An illustration of mechanisms for displaying layers of search results on a map is provided with reference to FIGS. 1-4. Suppose that user Susan is sitting in a coffee shop near Union Square, San Francisco. Susan is visiting San Francisco for the day and has her laptop in front of her on the table in order to figure out what to do with her day. Susan would like to visit two parks before the end of the day, Golden Gate Park and Bayview Park. A girl near Susan told Susan how to get to Golden Gate Park from Union Square, but did not know where Bayview Park was. Thus, Susan needs directions from Golden Gate Park to Bayview Park. Susan is also hungry, and would like to swing by a pizza place at sometime during the day. Also, Susan knows that her fuel tank is almost empty and that she should stop at a gas station before driving north to visit a friend in Vancouver. Susan knows that she can accomplish all of these tasks with a single session of a web-based mapping service. An example illustration of Susan using her laptop computer to accomplish these tasks is hereafter provided with reference to FIGS. 1-4.

Susan uses her laptop to launch a web browser application program, and types in the Uniform Resource Locator (URL) for a web-based mapping service. Susan's laptop sends a Hypertext Transfer Protocol (HTTP) request over the internet to a server system associated with the web-based mapping service. The server system returns resources for displaying a web page for the mapping service.

Susan selects a query input box on the displayed webpage, types in the query "Union Square, San Francisco, Calif.," and selects a "Search Maps" graphical interface element. Susan's laptop sends an HTTP request with the search query to the server system. The server system ranks multiple search results, from among a datastore of search results that identify venues and geographical places, based on the query. A single search result identifying a plaza in San Francisco is determined by the server system to be responsive to Susan's query and is returned to Susan's laptop computer. The server can identify other search results that are responsive to Susan's query, but the particular search result that was returned to Susan's laptop can exceed a threshold of relevance or be associated with a significantly higher relevance score than other of the search results.

The server system returns to Susan's laptop a set of resources for rendering the web page displayed in FIG. 1. The resources can include information that identifies the single search result (along with a geographical location of the single search result), map tiles for displaying a portion of a map around the geographical location, and additional content for rendering the webpage.

FIG. 1 is a screenshot of a mapping webpage provided in response to the query "Union Square." The webpage displays, in a viewport portion 102 of the web browser, a map of San Francisco. A single pin 154 is displayed on the map of San Francisco at a geographical location of "Union Square." The query input text box 106 displays the search query that Susan previously entered. A left pane 108 displays information that is associated with the single search result for the query "Union Square."

Susan would like to also know how to get from Golden Gate Park to Bayview Park. Thus, Susan selects the query input text box 106, and types the query "Golden Gate Park to Bayview Park." Susan selects the "Search Maps" interface element 110, and the web browser navigates to the display that is provided in FIG. 2.

Figure 2:
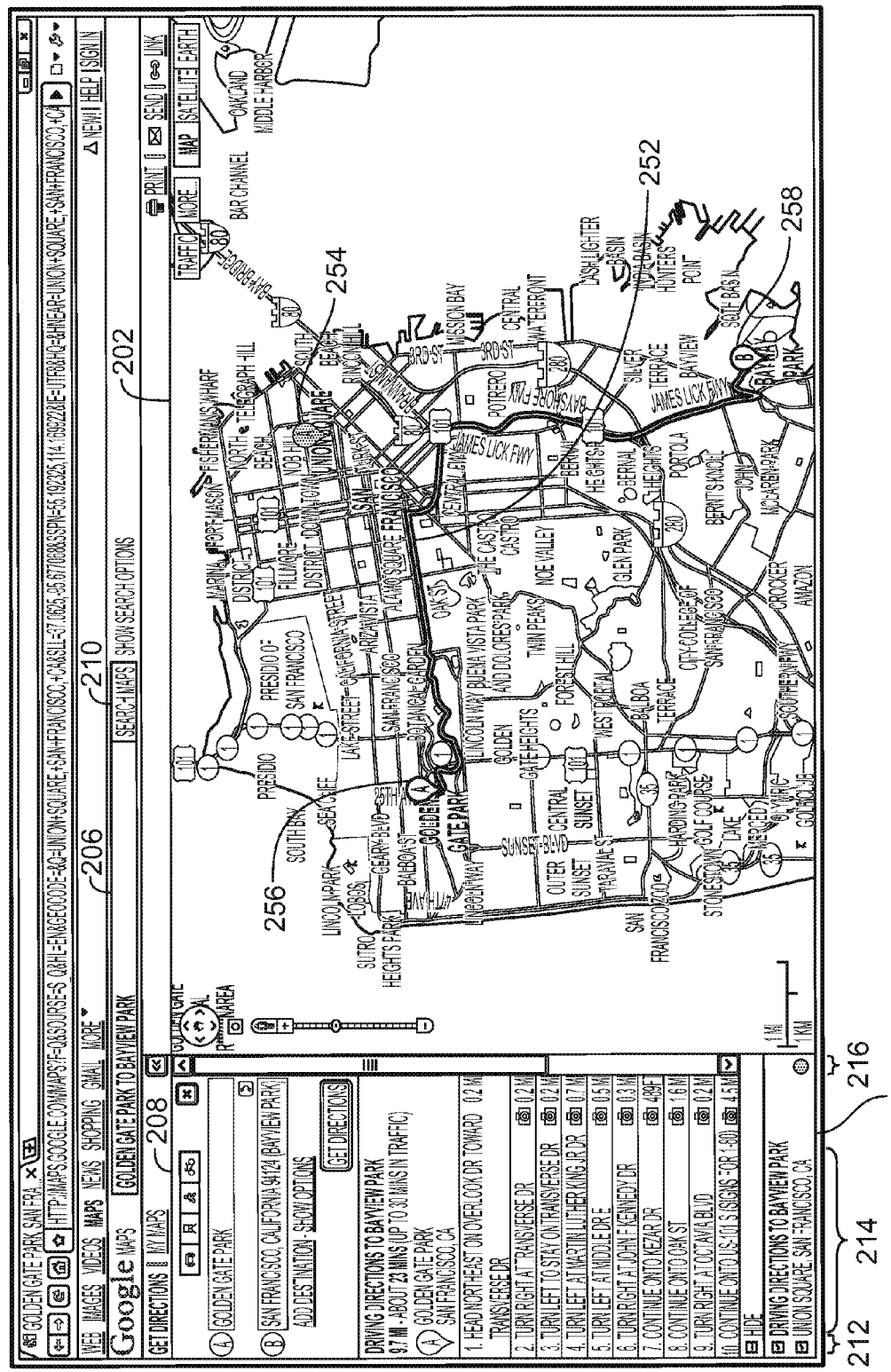
FIG. 2 is a screenshot of an example mapping webpage that is provided in response to the query "Golden Gate Park to Bayview Park."

FIG. 2 is a screenshot of a mapping webpage that is provided in response to the query "Golden Gate Park to Bayview Park." As FIG. 2 illustrates, the pin for Union Square has remained on the map, but is supplemented by a line 252 that designates a route between a starting location pin 256 at Golden Gate Park and an ending location pin 258 at Bayview Park. The information on Union Square in the left pane 208 has been replaced with details on the route between the starting location pin 256 and the ending location pin 258.

Additionally, at a bottom of the left pane 208 is a layers toolbar 218. The layers toolbar 218 includes, for each of the "Union Square" and "Golden Gate Park to Bayview Park" search queries, a user selectable checkbox 212 and text 214 identifying the search query. Also, a small graphical interface element 216 identifies a color of the graphical interface elements on the map that are associated with the "Union Square" query.

The checkboxes allow Susan to identify which of the layers in the toolbar 218 are "visible" in the map viewport 202. For example, if Susan de-selects the "Union Square" checkbox, the pin 254 that identifies the location of Union Square can disappear from the map. Should Susan re-select the checkbox, the pin 254 can reappear. Similarly, Susan can select the checkbox for the "driving directions" search query to toggle visibility of the line 252 and the pins 256 and 258.

Further, Susan can select the text 214 for either of the "driving directions" and "Union Square" queries to set a "focus" of the mapping web page. In this example, the "driving directions" query layer has focus, as illustrated by the bold characteristics of the text in toolbar 218. Thus, the left pane 208 displays information that is responsive to the "driving directions" query. If Susan selected the text for the "Union Square" query (changing the focus to the "Union Square" query layer), the content in the left pane 108 can change to the content that is displayed in the left pane of FIG. 1.

Susan would like to stop at a pizza place that is either around Union Square or along the drive from Golden Gate Park to Bayview Park. Thus, Susan enters the query "pizza" in the query input text box 206 and selects the search maps graphical interface element 210. In response, the web browser navigates to the display that is provided in FIG. 3.

Figure 3:
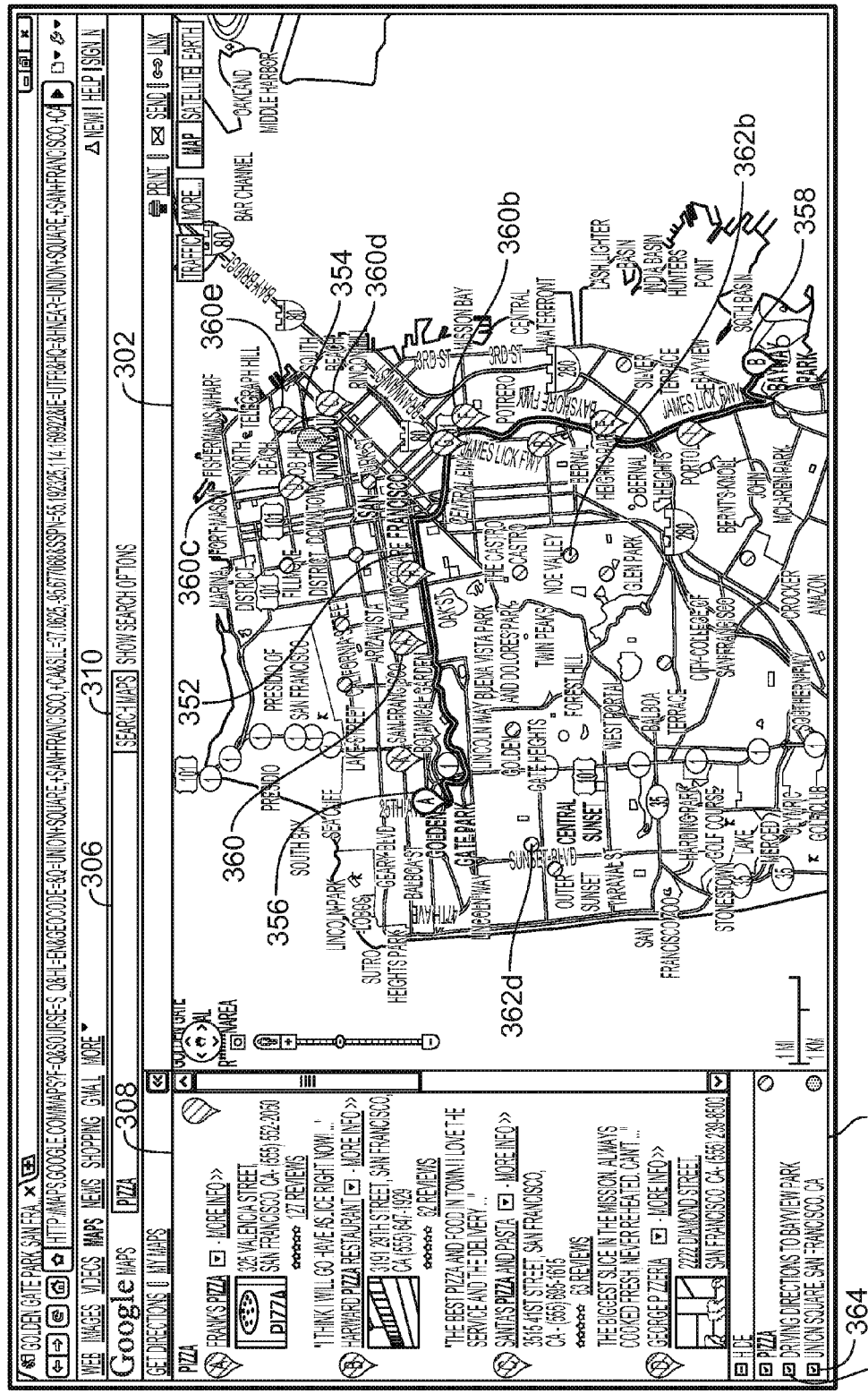
FIG. 3 is a screenshot of an example mapping webpage that is provided in response to the query "pizza," and leaving focus with the query layer "pizza."

FIG. 3 is a screenshot of a mapping webpage that is provided in response to the query "pizza." Focus is provided to the query layer "pizza." The pin 354 for Union Square has remained on the map along with the pins 356 and 358 and line 352 for the driving directions. Multiple additional graphical interface elements have appeared for display on map. For example, multiple pins (e.g., pins 360a and 360b) represent locations that are associated with various search results that are responsive to the pizza query. Also multiple markers (e.g., markers 362a and 362b) represent various pizza search results that are not scored as highly as the pizza search results that are identified with the pins. A set of graphical interface elements that represent the "pizza" query layer have been added to the layers toolbar 318. The content in the left pane 308 has been replaced with content that identifies information for at least some of the "pizza" pins that have been added to the map 302.

As illustrated in FIG. 3, the pins 360 on map 302 are grouped around the driving route 352 and the Union Square pin 354, even though there are many other pizza place search results (as illustrated by the markers 362). The pins 360 emphasize those pizza search results that are relevant to the context of the other layers that are visible on the map 302. In other words, the search query "pizza" is an ambiguous search query that is not itself associated with a single geographical context, and thus can borrow context from other layers. Accordingly, pizza search results that are geographically near the driving route or are geographically near Union Square can be weighted more heavily.

For example, the mapping service server system can assign a score to each of the search queries based on various factors. Example factors can include how often terms in the query appear in content that is stored for the search result, and how often users select a search result in response to entering the search query. The mapping service server system or Susan's laptop can weight the score for each of multiple search results that are associated with a present view of the map based on a distance between the search result and a geographical context of one or more other layers. For example, a distance between a search results and a route may be a number that identifies a conceptual distance between a location associated with the search result and a closest of a continuum of locations in the route. The distance may be as the bird flies or based on navigable roadways or paths. Geographical contexts of different layers can weight search results differently based on how recent a particular layer had focus.

After the scores for each of the search results have been weighted, those search results that are associated with scores that exceed a threshold, or that are included in a group of the highest scoring "N" search results can be displayed on the map 302 more prominently than the other search results (e.g., as the pins 360). In some examples, the high-ranking search results are displayed exclusively (e.g., the markers 362 can not appear alongside the pins 360 for a layer).

Susan can interact with the layers toolbar 318 to modify interactions between the layers of the map 302. For example, if Susan de-selects the checkbox 364 for the "Union Square" layer, the pin 354 that identifies the location of Union Square can disappear from the map. Further, the Union Square geographical context can no longer be used to weight "pizza" search results. Thus, a score for each of the pizza search results 360c-e that are clustered around the Union Square pin 354 can be reduced, and each of the search results 360c-e can disappear from display in the map 302, or be replaced by circular markers (e.g., a marker 362). Further, pizza search results that are close the route 352 can change from a marker 362 to a pin 360 as more pins can become "available" for placement by the route 352. The content of the left pane 308 can similarly change to display content for each of a new set of highest ranking pins.

Should Susan further deselect the checkbox 368 for the driving directions layer (so that no query layers with a context are visible), the route 352 and the pins 356 and 358 can be removed from the map display. In response, the pizza search results can no longer be weighted based on a distance from the route 352, but can be evaluated based on a relevance to the geographical region displayed within the map viewport 302. Thus, the geographical context for the pizza search results is no longer provided based on another search query layer, but is instead provided based on a view of the map. Thus, the display in FIG. 3 can change so that the pizza pins disperse across the map of San Francisco.

Susan also needs to get gas at some point during the day, and thus types the query "gas station" into the search query text box 306 and selects the search maps graphical interface element 310. In response, a set of pins and markers for gas stations are overlaid on the map that is depicted in FIG. 3. (This view of the browser is not provided in a figure.) The gas station query layer can receive focus upon submission of the query. Because the server system can be unable to determine a specific geographical context based on the query "gas station," the context for placement of pins can be defined by other layers that are visible. Thus, the gas station pins can cluster around the driving route 352 and the Union Square pin 354. Other gas stations that are not as geographically relevant to the driving route or to Union Square can appear as circular markers.

In some examples, each of the pizza markers and pins can provide a geographical context for the gas stations. For example, where a gas station is particularly close to a pizza place, the search result for the gas station can be scored more heavily and a pin can appear instead of a marker. In other examples, pizza markers do not provide a geographical context because the query "pizza" is an ambiguous query. In some examples, the pizza pins 360 are changed to small circular markers 362 in response to the gas station query (and focus being changed to the gas station query layer).

Susan suddenly gets a call from a friend, whom is waiting for Susan at Golden Gate Park. Susan knows that she will upset her friend if she has pizza before she drives from Union Square to Golden Gate Park, or even if she stops for gas before getting to Golden Gate Park. Still, Susan will need to get food and gas on some point on the drive over to Bayview Park. Thus, Susan would like the mapping service webpage to display the pizza places and gas stations that are along the driving route from Golden Gate Park to Bayview Park. Accordingly, Susan selects the interface element 466 for providing focus to the driving directions query layer. In response, the display in FIG. 4 can be provided to Susan.

Figure 4:
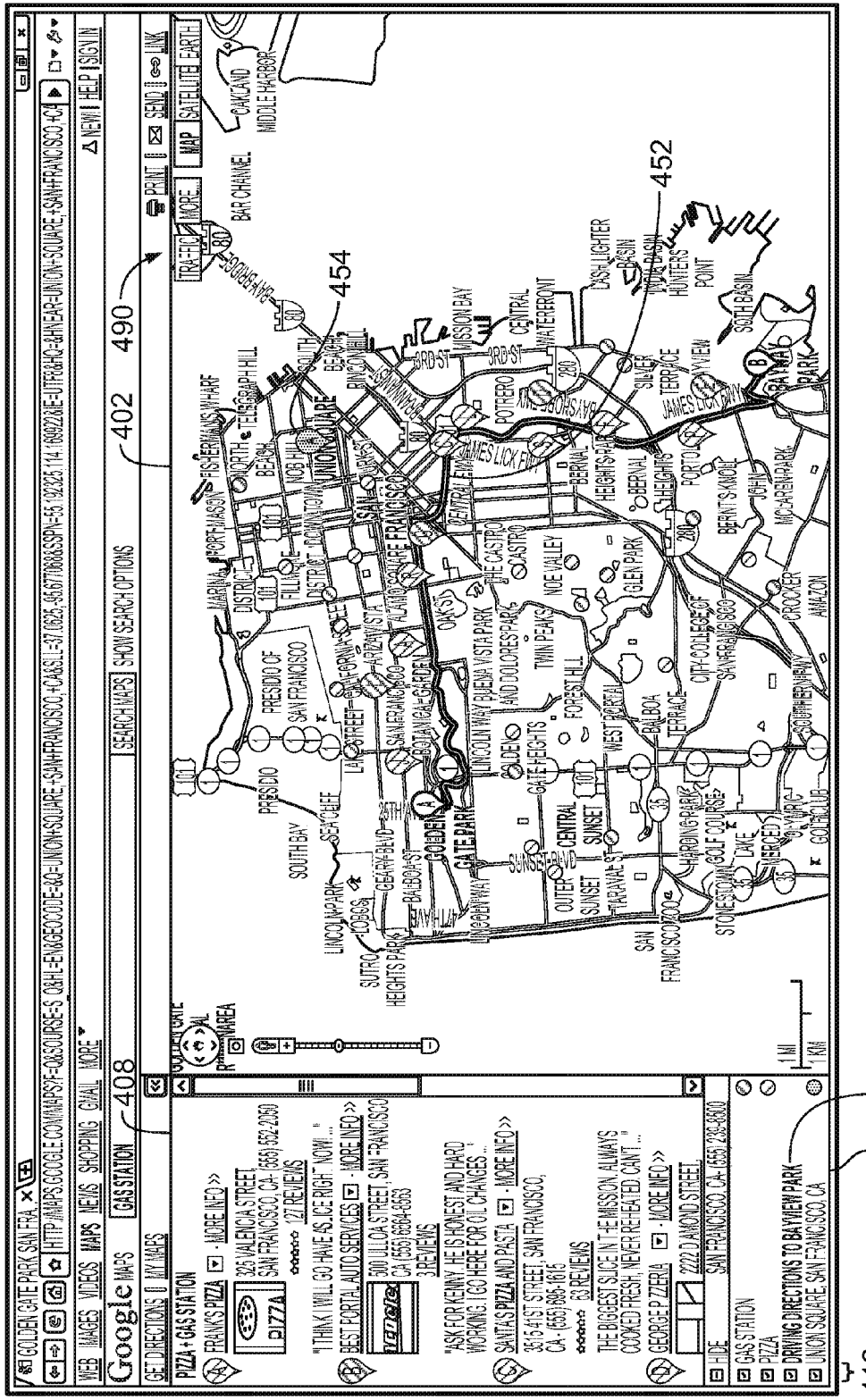
FIG. 4 is a screenshot of an example mapping webpage that is provided in response to the query "gas station," and providing focus to the "driving directions" query layer.

FIG. 4 is a screenshot of a mapping webpage that is provided in response to the query "gas station," and a user providing focus to the "driving directions" query layer. As illustrated in FIG. 4, both the pizza and gas station search results that are geographically near the driving route are emphasized with pins. In other words, when a query layer that is associated with an unambiguous query (e.g., a query from which a geographical context can be determined) has focus, search results for multiple other layers that are associated with an ambiguous query can be re-scored to weight more prominently those search results that are near the geographical context of the focused layer. Further, the left pane 408 can display content for a combination of pizza and gas station search results.

In summary, the layers toolbar 418 has been populated with multiple search query layers that have their own context (e.g., the Union Square and driving directions layers), and multiple search query layers that do not have their own context (e.g., the gas station and pizza layers). Providing focus to a layer that does not have its own context can result in search results for the layer "spreading out" to cluster around the geographical context for those layers that have context and that are visible. Providing focus to a layer that has its own context can result in search results for layers that do not have their own context "grouping" around the geographical context for the focused layer.

In various examples, the addition and removal of graphical interface elements from the map are performed in response to a user selection of a graphical interface element in the layers toolbar, and without any user-input subsequent to the user selection of the graphical interface element in the layers toolbar. For example, de-selection of the checkbox 368 (e.g., by clicking with a mouse on the checkbox 368) for the driving direction query layer in FIG. 3 can cause the computing device to remove from the display of the map 302 the route 352 and the pins 356 and 358 without user-input subsequent to de-selection of the checkbox 368. Similarly, the addition and removal of pins to a map in response to a user providing focus to a different query layer can be performed without additional user input beyond the user input to provide focus to the different query layer (e.g., by selection of text in the layers toolbar).

FIG. 5A is a chart illustrating example interactions between four search query layers. The chart describes interactions between layers for each of four search queries, for example, the "gas station," "pizza," "driving directions to Bayfield park," and "Union Square" queries, as illustrated in FIG. 5. The interactions are provided after a user has entered all four search query layers.

In box 502, Susan has provided focus to the gas station query layer, for example, by selecting the words "gas station" in the layers toolbar 418. In response, the gas station search results in the map 402 that are near graphical interface elements for other layers are emphasized. For example, gas stations that are along the driving route or that are near Union Square can be emphasized. As described above, gas stations that are near pizza places can optionally be emphasized.

In various examples, Susan can remove the visibility of both the driving directions query layer and the Union Square query layer by de-selecting the checkboxes 412 that accompany each layer. In response, the search results that are emphasized in the map can be those search results that are highest scoring without regard to the driving directions or Union Square context. In various examples, repeated user selection of the gas station search result layer (e.g., repeated selection of the text "gas station" in the layers toolbar 418) can cause the map 402 to toggle between a non-context-specific display of gas stations (e.g., as if the driving directions and Union Square layers were not visible), and a context-specific display of gas stations (e.g., as when the driving directions and Union Square layers are visible).

In box 504, Susan has provided focus to the pizza query layer. In response, the pizza search results that are near the driving route and that are near Union Square can be emphasized, similar to the above described example for the gas station layer.

In box 506, Susan has provided focus to the driving route layer, for example, by selecting the words "driving directions to Bayview Park" in the layers toolbar 418. In response, the search results in the map 402 that are emphasized are those search results that are near the graphical interface elements for the driving directions layer. For example, pizza places and gas stations that are along the driving route can be emphasized.

In various examples, Susan can remove the visibility of the gas station search query layer by selecting the respective checkbox 412 in the layers toolbar 418. In response, the pins and markers that represent gas station search results can be removed from the display of map 502.

In box 508, Susan has provided focus to the Union Square query layer. In response, the gas station and pizza search results that are near the Union Square pin 454 can be emphasized, similar to the above described example for the driving route layer.

Figure 5B:
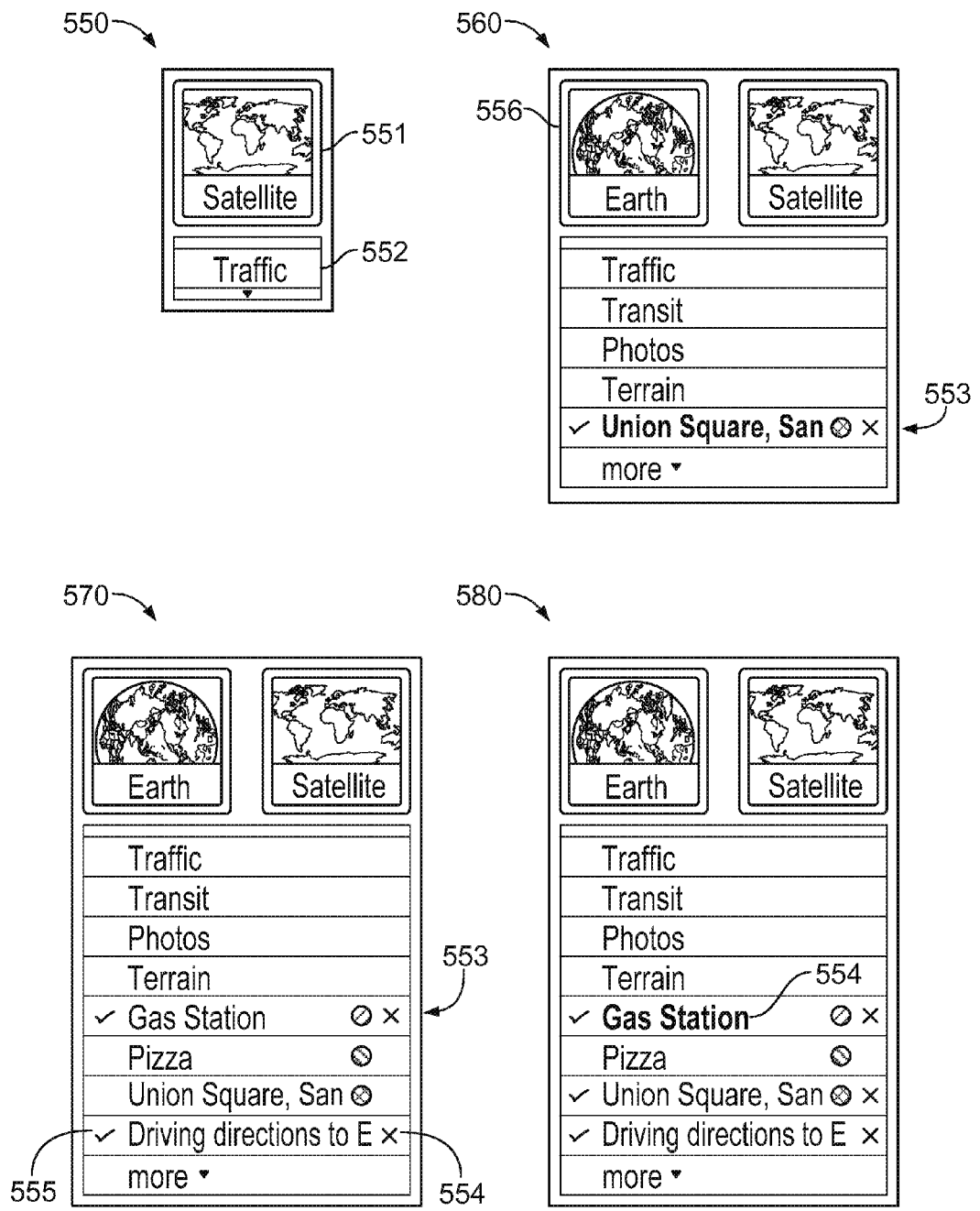
FIG. 5B illustrates another graphical scheme for the layers toolbar.

FIG. 5B illustrates another graphical scheme for the layers toolbar. In this graphical scheme, the first graphical display 550 is displayed to a user instead of the buttons 490 that are illustrated in FIG. 4. A user may click on the "Satellite" graphical interface element 551 in order to change the present view of the displayed geographical area from a map view to a satellite view. In further response to such a selection, the "Satellite" graphical interface element may change to a "Maps" graphical interface element. Selection of the "Traffic" graphical interface element 552 causes the present view of the displayed geographical area to include indications of vehicle traffic.

The user's computing system presents the second graphical display 560 in response to the user performing a mouse-over selection of any component of the first graphical display 550. The second graphical display shows an "Earth" graphical interface element 556 which, when selected, causes the computing system to present a view of the displayed geographical area using an "Earth" virtual globe mapping display. The second graphical display 560 also includes a layers toolbar 553 section of the second graphical display 560. In this illustration, the layers toolbar 553 shows that the user has previously entered a single search query for "Union Square, San Francisco, Calif."

The user may subsequently enter multiple additional search queries, as described above with reference to FIGS. 1-4. The third graphical display 570 shows the layers toolbar 553 after the user has entered such multiple additional search queries. Some of the layers in the layers toolbar 553 include an "x" graphical interface element 554 that, when selected, causes the computing system to remove the selected layer from the layers toolbar 553 and also remove from the displayed geographical area any associated graphical interface elements (e.g., any combination of pins, markers, and lines that are associated with the selected layer).

The visibility of layers (as discussed above) is identified by check marks (e.g., check mark 555). A check mark indicates that the layer is presently being displayed on the map, while no check mark indicates that the layer is not presently being displayed on the map. A user can make a non-visible layer visible by selecting the region of the layers toolbar 553 that identifies the layer (e.g., the region of the layers toolbar 553 that lies includes the identifying text and lies within the horizontal lines that bound the identifying text).

A user may provide focus to a layer by selecting an already visible layer an additional time. For example, the fourth graphical display 580 identifies the "Gas Station" layer with bold text 554. As such, the "Gas Station" layer has focus. A user may switch focus to another layer by selecting the other layer (visible or non-visible). Accordingly, selecting a non-visible layer (e.g., with a mouse click or a finger tap) renders the layer visible and provides focus to the layer. Selecting a visible layer that does not have focus causes that layer to obtain focus. Selecting a visible layer that has focus an additional time renders the layer non-visible and removes focus from the layer. It is possible that no layers have focus.

Figure 6:
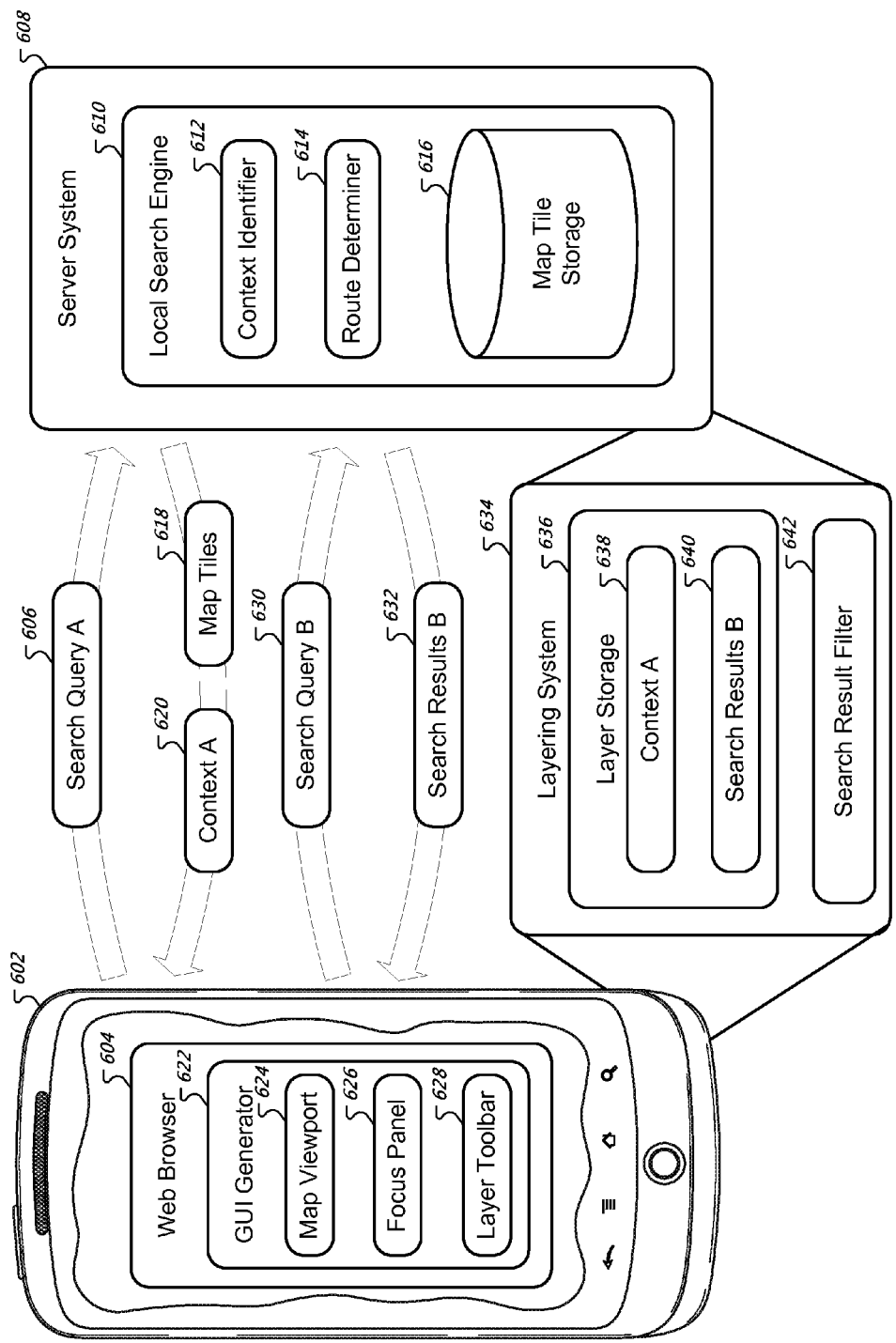
FIG. 6 illustrates an example system for displaying layers of search results on a map.

FIG. 6 illustrates a system for displaying layers of search results on a map. Mobile computing device 602 includes a web browser 604 that submits a search query 606 to a server system 608. A local search engine 610 at the server system receives the query and returns a geographical context 620 and map tiles 618 that are responsive to the query. The web browser 604 submits a second search query 630, and in response, receives search results 632.

A GUI generator 622 generates a display that includes a map view port 624, a focus panel 626, and a layer toolbar 628. A layering system 634 is stored at the mobile computing device 602, the server system 608, or a combination of both. The map layering system 634 stores, for each of the search queries, information that is responsive to the search query in a layer storage 636. The layering system 634 includes a search result filter 642 for selecting subsets of search results to display in the map viewport 624 based on one or more geographical contexts.

In more detail, an individual can use the mobile computing device 602 to access a mapping service. For example, a user of the mobile computing device can use the web browser to visit a website for the mapping service. The website can provide the user with an option for submitting a search query to the server system by typing or speaking a search query into the mobile computing device 602. The search query 606 can be transmitted over a network (e.g., the internet) to the server system.

The search query 606 that is received by the server system 608 can be provided to a local search engine 610. The local search engine can receive search queries and return information that is responsive to the search queries. For example, if the search query is determined by the local search engine to be for a geographical place, the local search engine can identify a geographical location for the place, and provide to the computing device 602 map tiles 618 for an area that includes the geographical place, along with an indication of the geographical place. If the search query is determined to be for directions between two places, the route determiner 614 can determine a route between the two places, and supply information identifying the route to the mobile computing device 602. In some examples, a context identifier 612 determines a geographical context that is associated with a search query.

In this example, the server system has determined particular map tiles 618 and a geographical context 620 that are responsive to the search query 606, and returns this information to the mobile computing device 602. The context 620 and map tiles 618 can be included in a set of resources that are returned as responsive to the search query 606.

The GUI generator 622 can generate a display of a webpage based on the returned resources. For example, the GUI generator 622 can display the webpage illustrated in FIG. 1. The displayed webpage can include a map view port 624 (e.g., the map viewport 102), and a focus panel 626 (e.g., the left pane 108).

A user of the mobile computing device 602 can submit a second search query 630, for example, using the query text input box 106 that is illustrated in FIG. 1. The local search engine 610 can determine multiple search results that are responsive to the second search query. The second search query 630 may not include user-generated content that is sufficient for the context identifier 612 to identify a geographical context that is relevant to the query. For example, the query can be associated with search results that are associated with venues from across a broad geographical region.

Thus, the query 630 can be an "ambiguous" query (described earlier in this document). Accordingly, the search results 632 that are returned to the computing device 502 can be determined based on context that is associated with a present view of the map view port 624 region of the web browser.

The computing device can place indicators for at least a portion of the received search results 632 on a region of the map that is being displayed in the map view port 624. Additionally, because the map viewport 624 can display, on the map, visual indicators that correspond to more than one successive query, the GUI generator 622 can display a layer selector (e.g., the layer toolbar 218) that enables a user of the mobile computing device to modify which of multiple layers are displayed, and how the layers interact.

A layering system 634 includes a layer storage 636 that includes information for each of multiple search query layers. For example, the layer storage can include a geographical context 638 that was identified as responsive to the first search query 606. The layer storage can include information identifying the search results 640 that were identified as responsive to the second search query 630.

Based on user interaction with the layer toolbar 628, the map viewport 624 can display a subset of the search results 640 that is determined based on the context 638. Thus, a search result filter 642 can apply the context 638 to the set of search results 640 in order to select a subset of the search results that are relevant to the context 638 (e.g., the search results that are geographically near the context 638). The selected subset of search results can be emphasized in the map viewport 624 (e.g., appear differently than other search results of a same search query layer), or can appear exclusively in the map viewport 624 (e.g., appear as the only search results for the search query layer).

The search results filter 642 can select the subset of search results based on distance of the search results from the context 538. In a first example, the search results that are within a predetermined distance of the context can be selected as the subset. In another example, the search results that are within a predetermined distance of the context can have their respective scores weighted more heavily. In yet another example, a weighting of each search result can be based on a distance from the context. For example, the farther away a search result is from the context, the less heavily it will be weighted (e.g., have its score proportionally modified).

In various examples, layers from successive search queries are added to the layer toolbar 628 (and the layer storage 636) until a mapping service browsing session is terminated. A mapping service browsing session can terminate when the user navigates to a website that is not hosted by the mapping service (e.g., by typing in a URL for the other website or by selecting a bookmark for the other website). A mapping service can also end when the user closes the web browser window.

In some examples, layers are stored in association with the user's user account, and may not be removed when the user closes the web browser or navigates to another website. Thus, the user can visit the mapping service website several weeks later and see a list of layers from previous search sessions. The user can be able to remove particular layers or select a "clear all" button to start a fresh browsing session.

In various examples, a user submits a particular query and is provided a display of a map that includes search results for the particular query. The particular query can be identified within a layers toolbar as one of multiple layers. The particular query, however, may have been mistyped or included content that otherwise prompts the server system to propose a refined query. The proposed query can be displayed to the user in a same web browser screen that is displaying the map with the search results for the particular query.

Should the user select the proposed query, the search results on the map for the particular query can be removed from display and replaced with a display of search results for the refined query. The identification of the particular query within the layers toolbar can be removed, and an identification of the proposed query can appear in the layers toolbar. Thus, if a user incorrectly types a query and later corrects his mistake, the incorrect query can be automatically removed from display in the layers toolbar and the map so that the toolbar and map display are not polluted by the incorrect query.

Figure 7:
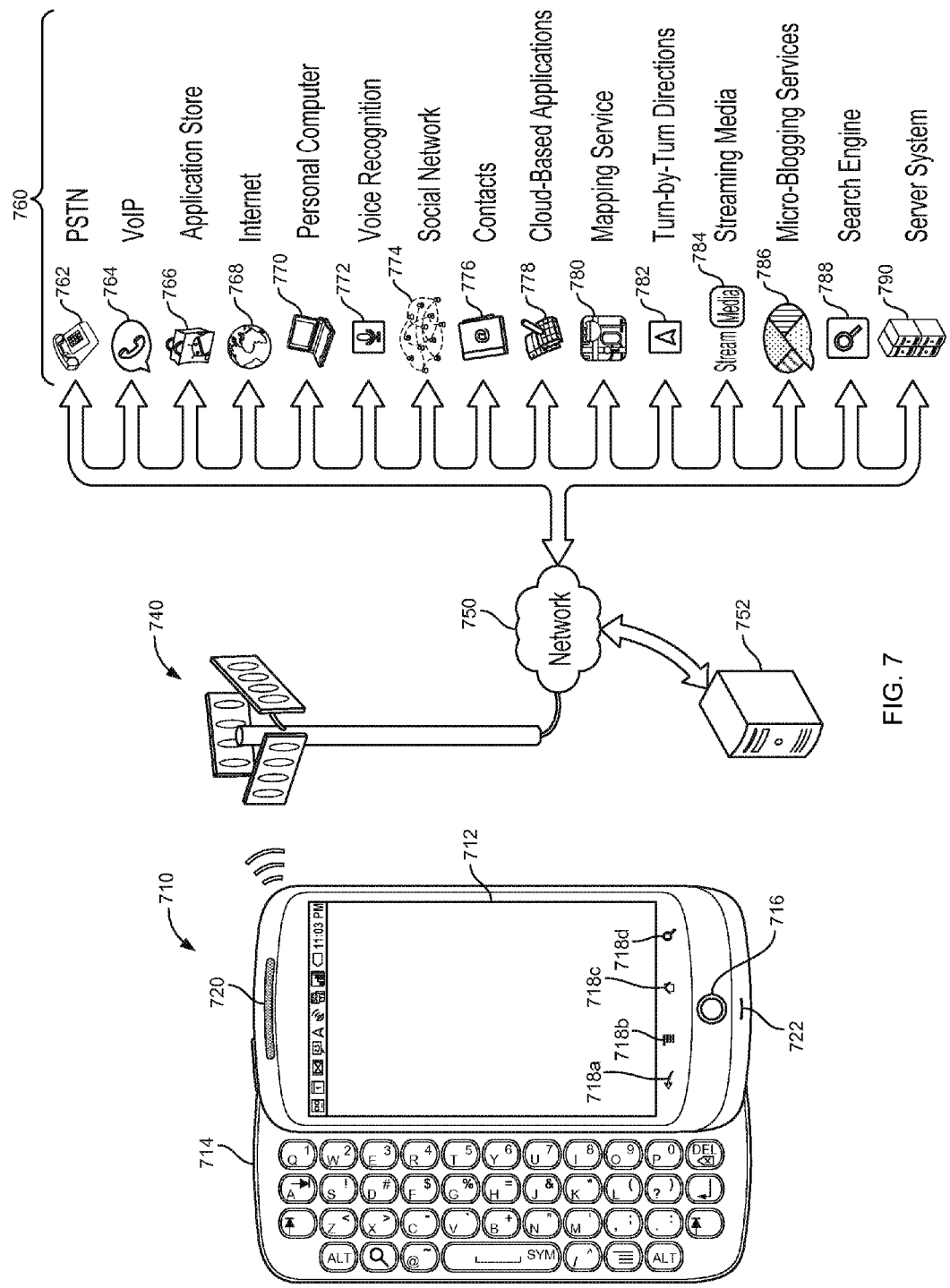
FIG. 7 is a conceptual diagram of an example system that can be used to implement the systems and methods described in this document.

Referring now to FIG. 7, a conceptual diagram of a system that can be used to implement the systems and methods described in this document is illustrated. Mobile computing device 710 can wirelessly communicate with base station 740, which can provide the mobile computing device wireless access to numerous services 760 through a network 750.

In this illustration, the mobile computing device 710 is depicted as a handheld mobile telephone (e.g., a smartphone or an application telephone) that includes a touchscreen display device 712 for presenting content to a user of the mobile computing device 710. The mobile computing device 710 includes various input devices (e.g., keyboard 714 and touchscreen display device 712) for receiving user-input that influences the operation of the mobile computing device 710. In further implementations, the mobile computing device 710 can be a laptop computer, a tablet computer, a personal digital assistant, an embedded system (e.g., a car navigation system), a desktop computer, or a computerized workstation.

The mobile computing device 710 can include various visual, auditory, and tactile user-output mechanisms. An example visual output mechanism is display device 712, which can visually display video, graphics, images, and text that combine to provide a visible user interface. For example, the display device 712 can be a 3.7 inch AMOLED screen. Other visual output mechanisms can include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 712). Further, the mobile computing device 710 can include one or more speakers 720 that convert an electrical signal into sound, for example, music, an audible alert, or voice of an individual in a telephone call.

An example mechanism for receiving user-input includes keyboard 714, which can be a full qwerty keyboard or a traditional keypad that includes keys for the digits '0-9', '*', and '#.' The keyboard 714 receives input when a user physically contacts or depresses a keyboard key. User manipulation of a trackball 716 or interaction with a trackpad enables the user to supply directional and rate of rotation information to the mobile computing device 710 (e.g., to manipulate a position of a cursor on the display device 712).

The mobile computing device 710 can be able to determine a position of physical contact with the touchscreen display device 712 (e.g., a position of contact by a finger or a stylus). Using the touchscreen 712, various "virtual" input mechanisms can be produced, where a user interacts with a graphical user interface element depicted on the touchscreen 712 by contacting the graphical user interface element. An example of a "virtual" input mechanism is a "software keyboard," where a keyboard is displayed on the touchscreen and a user selects keys by pressing a region of the touchscreen 712 that corresponds to each key.

The mobile computing device 710 can include mechanical or touch sensitive buttons 718*a-d*. Additionally, the mobile computing device can include buttons for adjusting volume output by the one or more speakers 720, and a button for turning the mobile computing device on or off. A microphone 722 allows the mobile computing device 710 to convert audible sounds into an electrical signal that can be digitally encoded and stored in computer-readable memory, or transmitted to another computing device. The mobile computing device 710 can also include a digital compass, an accelerometer, proximity sensors, and ambient light sensors.

An operating system can provide an interface between the mobile computing device's hardware (e.g., the input/output mechanisms and a processor executing instructions retrieved from computer-readable medium) and software. The operating system can provide a platform for the execution of application programs that facilitate interaction between the computing device and a user.

The mobile computing device 710 can present a graphical user interface with the touchscreen 712. A graphical user interface is a collection of one or more graphical interface elements and can be static (e.g., the display appears to remain the same over a period of time), or can be dynamic (e.g., the graphical user interface includes graphical interface elements that animate without user input).

A graphical interface element can be text, lines, shapes, images, or combinations thereof. For example, a graphical interface element can be an icon that is displayed on the desktop and the icon's associated text. In some examples, a graphical interface element is selectable with user-input. For example, a user can select a graphical interface element by pressing a region of the touchscreen that corresponds to a display of the graphical interface element. In some examples, the user can manipulate a trackball to highlight a single graphical interface element as having focus. User selection of a graphical interface element can invoke a pre-defined action by the mobile computing device. In some examples, selectable graphical interface elements further or alternatively correspond to a button on the keyboard 704. User selection of the button can invoke the pre-defined action.

In some examples, the operating system provides a "desktop" user interface that is displayed upon turning on the mobile computing device 710, activating the mobile computing device 710 from a sleep state, upon "unlocking" the mobile computing device 710, or upon receiving user selection of the "home" button 718*c*. The desktop graphical interface can display several icons that, when selected with user-input, invoke corresponding application programs. An invoked application program can present a graphical interface that replaces the desktop graphical interface until the application program terminates or is hidden from view.

User-input can manipulate a sequence of mobile computing device 710 operations. For example, a single-action user input (e.g., a single tap of the touchscreen, swipe across the touchscreen, contact with a button, or combination of these at a same time) can invoke an operation that changes a display of the user interface. Without the user-input, the user interface can not have changed at a particular time. For example, a multi-touch user input with the touchscreen 712 can invoke a mapping application to "zoom-in" on a location, even though the mapping application can have by default zoomed-in after several seconds.

The desktop graphical interface can also display "widgets." A widget is one or more graphical interface elements that are associated with an application program that has been executed, and that display on the desktop content controlled by the executing application program. A widget's application program can start with the mobile telephone. Further, a widget can not take focus of the full display. Instead, a widget can only "own" a small portion of the desktop, displaying content and receiving touchscreen user-input within the portion of the desktop.

The mobile computing device 710 can include one or more location-identification mechanisms. A location-identification mechanism can include a collection of hardware and software that provides the operating system and application programs an estimate of the mobile telephone's geographical position. A location-identification mechanism can employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 710 can include other application modules and hardware. A call handling unit can receive an indication of an incoming telephone call and provide a user capabilities to answer the incoming telephone call. A media player can allow a user to listen to music or play movies that are stored in local memory of the mobile computing device 710. The mobile telephone 710 can include a digital camera sensor, and corresponding image and video capture and editing software. An internet browser can enable the user to view content from a web page by typing in an addresses corresponding to the web page or selecting a link to the web page.

The mobile computing device 710 can include an antenna to wirelessly communicate information with the base station 740. The base station 740 can be one of many base stations in a collection of base stations (e.g., a mobile telephone cellular network) that enables the mobile computing device 710 to maintain communication with a network 750 as the mobile computing device is geographically moved. The computing device 710 can alternatively or additionally communicate with the network 750 through a Wi-Fi router or a wired connection (e.g., Ethernet, USB, or FIREWIRE). The computing device 710 can also wirelessly communicate with other computing devices using BLUETOOTH protocols, or can employ an ad-hoc wireless network.

A service provider that operates the network of base stations can connect the mobile computing device 710 to the network 750 to enable communication between the mobile computing device 710 and other computerized devices that provide services 760. Although the services 760 can be provided over different networks (e.g., the service provider's internal network, the Public Switched Telephone Network, and the Internet), network 750 is illustrated as a single network. The service provider can operate a server system 752 that routes information packets and voice data between the mobile computing device 710 and computing devices associated with the services 760.

The network 750 can connect the mobile computing device 710 to the Public Switched Telephone Network (PSTN) 762 in order to establish voice or fax communication between the mobile computing device 710 and another computing device. For example, the service provider server system 752 can receive an indication from the PSTN 762 of an incoming call for the mobile computing device 710. Conversely, the mobile computing device 710 can send a communication to the service provider server system 752 initiating a telephone call with a telephone number that is associated with a device accessible through the PSTN 762.

The network 750 can connect the mobile computing device 710 with a Voice over Internet Protocol (VoIP) service 764 that routes voice communications over an IP network, as opposed to the PSTN. For example, a user of the mobile computing device 710 can invoke a VoIP application and initiate a call using the program. The service provider server system 752 can forward voice data from the call to a VoIP service, which can route the call over the internet to a corresponding computing device, potentially using the PSTN for a final leg of the connection.

An application store 766 can provide a user of the mobile computing device 710 the ability to browse a list of remotely stored application programs that the user can download over the network 750 and install on the mobile computing device 710. The application store 766 can serve as a repository of applications developed by third-party application developers. An application program that is installed on the mobile computing device 710 can be able to communicate over the network 750 with server systems that are designated for the application program. For example, a VoIP application program can be downloaded from the Application Store 766, enabling the user to communicate with the VoIP service 764.

The mobile computing device 710 can access content on the internet 768 through network 750. For example, a user of the mobile computing device 710 can invoke a web browser application that requests data from remote computing devices that are accessible at designated universal resource locations. In various examples, some of the services 760 are accessible over the internet.

The mobile computing device can communicate with a personal computer 770. For example, the personal computer 770 can be the home computer for a user of the mobile computing device 710. Thus, the user can be able to stream media from his personal computer 770. The user can also view the file structure of his personal computer 770, and transmit selected documents between the computerized devices.

A voice recognition service 772 can receive voice communication data recorded with the mobile computing device's microphone 722, and translate the voice communication into corresponding textual data. In some examples, the translated text is provided to a search engine as a web query, and responsive search engine search results are transmitted to the mobile computing device 710.

The mobile computing device 710 can communicate with a social network 774. The social network can include numerous members, some of which have agreed to be related as acquaintances. Application programs on the mobile computing device 710 can access the social network 774 to retrieve information based on the acquaintances of the user of the mobile computing device. For example, an "address book" application program can retrieve telephone numbers for the user's acquaintances. In various examples, content can be delivered to the mobile computing device 710 based on social network distances from the user to other members. For example, advertisement and news article content can be selected for the user based on a level of interaction with such content by members that are "close" to the user (e.g., members that are "friends" or "friends of friends").

The mobile computing device 710 can access a personal set of contacts 776 through network 750. Each contact can identify an individual and include information about that individual (e.g., a phone number, an email address, and a birthday). Because the set of contacts is hosted remotely to the mobile computing device 710, the user can access and maintain the contacts 776 across several devices as a common set of contacts.

The mobile computing device 710 can access cloud-based application programs 778. Cloud-computing provides application programs (e.g., a word processor or an email program) that are hosted remotely from the mobile computing device 710, and can be accessed by the device 710 using a web browser or a dedicated program. Example cloud-based application programs include GOOGLE DOCS word processor and spreadsheet service, GOOGLE GMAIL webmail service, and PICASA picture manager.

Mapping service 780 can provide the mobile computing device 710 with street maps, route planning information, and satellite images. The mapping service 780 can also receive queries and return location-specific results. For example, the mobile computing device 710 can send an estimated location of the mobile computing device and a user-entered query for "pizza places" to the mapping service 780. The mapping service 780 can return a street map with "markers" superimposed on the map that identify geographical locations of nearby "pizza places."

Turn-by-turn service 782 can provide the mobile computing device 710 with turn-by-turn directions to a user-supplied destination. For example, the turn-by-turn service 782 can stream to device 710 a street-level view of an estimated location of the device, along with data for providing audio commands and superimposing arrows that direct a user of the device 710 to the destination.

Various forms of streaming media 784 can be requested by the mobile computing device 710. For example, computing device 710 can request a stream for a pre-recorded video file, a live television program, or a live radio program. Example services that provide streaming media include YOUTUBE and PANDORA.

A micro-blogging service 786 can receive from the mobile computing device 710 a user-input post that does not identify recipients of the post. The micro-blogging service 786 can disseminate the post to other members of the micro-blogging service 786 that agreed to subscribe to the user.

A search engine 788 can receive user-entered textual or verbal queries from the mobile computing device 710, determine a set of internet-accessible documents that are responsive to the query, and provide to the device 710 information to display a list of search results for the responsive documents. In examples where a verbal query is received, the voice recognition service 772 can translate the received audio into a textual query that is sent to the search engine.

These and other services can be implemented in a server system 790. A server system can be a combination of hardware and software that provides a service or a set of services. For example, a set of physically separate and networked computerized devices can operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language can describe implementations that are optional. In some examples, "transmitting" from a first device to a second device includes the first device placing data into a network, but can not include the second device receiving the data.

Conversely, "receiving" from a first device can include receiving the data from a network, but can not include the first device transmitting the data.

Figure 8:
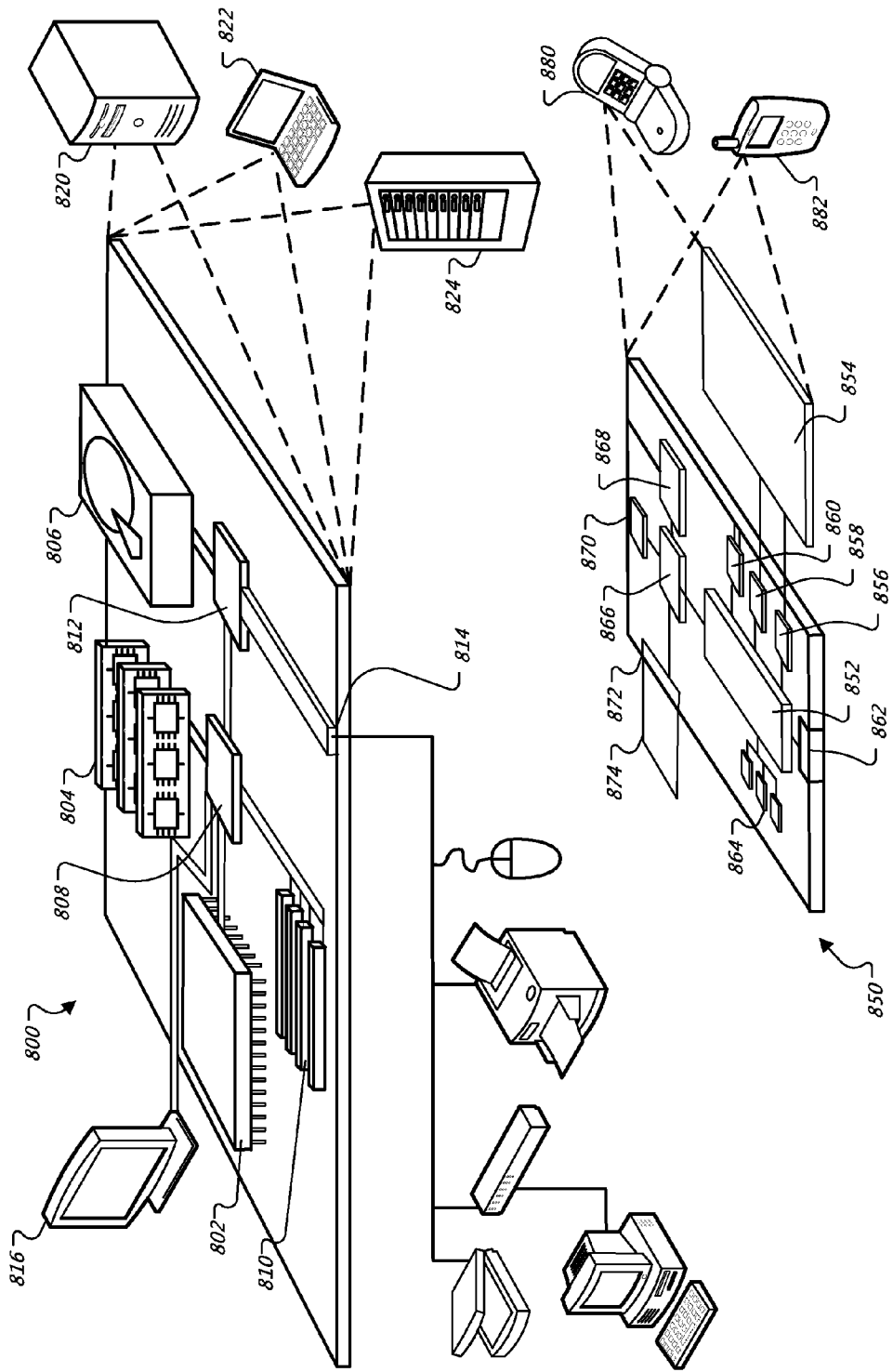
FIG. 8 is a block diagram of example computing devices that can be used to implement the systems and methods described in this document, as either a client or as a server or plurality of servers.

FIG. 8 is a block diagram of computing devices 800, 850 that can be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. Additionally computing device 800 or 850 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and can be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses can be used, as appropriate, along with multiple memories and types of memory. Also, multiple computing devices 800 can be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 can also be another form of computer-readable medium, such as a magnetic or optical disk.

The storage device 806 is capable of providing mass storage for the computing device 800. In one implementation, the storage device 806 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which can accept various expansion cards (not shown). In the implementation, low-speed controller 812 is coupled to storage device 806 and low-speed expansion port 814. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a standard server 820, or multiple times in a group of such servers. It can also be implemented as part of a rack server system 824. In addition, it can be implemented in a personal computer such as a laptop computer 822. Alternatively, components from computing device 800 can be combined with other components in a mobile device (not shown), such as device 850. Each of such devices can contain one or more of computing device 800, 850, and an entire system can be made up of multiple computing devices 800, 850 communicating with each other.

Computing device 850 includes a processor 852, memory 864, an input/output device such as a display 854, a communication interface 866, and a transceiver 868, among other components. The device 850 can also be provided with a storage device, such as a microdrive or other device, to provide additional storage. Each of the components 850, 852, 864, 854, 866, and 868, are interconnected using various buses, and several of the components can be mounted on a common motherboard or in other manners as appropriate.

The processor 852 can execute instructions within the computing device 850, including instructions stored in the memory 864. The processor can be implemented as a chipset of chips that include separate and multiple analog and digital processors. Additionally, the processor can be implemented using any of a number of architectures. For example, the processor 410 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 850, such as control of user interfaces, applications run by device 850, and wireless communication by device 850.

Processor 852 can communicate with a user through control interface 858 and display interface 856 coupled to a display 854. The display 854 can be, for example, a TFT (Thin-Film-Transistor Liquid Crystal Display) display or an OLED (Organic Light Emitting Diode) display, or other appropriate display technology. The display interface 856 can comprise appropriate circuitry for driving the display 854 to present graphical and other information to a user. The control interface 858 can receive commands from a user and convert them for submission to the processor 852. In addition, an external interface 862 can be provide in communication with processor 852, so as to enable near area communication of device 850 with other devices. External interface 862 can provide, for example, for wired communication in some implementations, or for wireless communication in other implementations, and multiple interfaces can also be used.

The memory 864 stores information within the computing device 850. The memory 864 can be implemented as one or more of a computer-readable medium or media, a volatile memory unit or units, or a non-volatile memory unit or units. Expansion memory 874 can also be provided and connected to device 850 through expansion interface 872, which can include, for example, a SIMM (Single In Line Memory Module) card interface. Such expansion memory 874 can provide extra storage space for device 850, or can also store applications or other information for device 850. Specifically, expansion memory 874 can include instructions to carry out or supplement the processes described above, and can include secure information also. Thus, for example, expansion memory 874 can be provide as a security module for device 850, and can be programmed with instructions that permit secure use of device 850. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that can be received, for example, over transceiver 868 or external interface 862.

Device 850 can communicate wirelessly through communication interface 866, which can include digital signal processing circuitry where necessary. Communication interface 866 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 868. In addition, short-range communication can occur, such as using a Bluetooth, WiFi, or other such transceiver (not shown). In addition, GPS (Global Positioning System) receiver module 870 can provide additional navigation- and location-related wireless data to device 850, which can be used as appropriate by applications running on device 850.

Device 850 can also communicate audibly using audio codec 860, which can receive spoken information from a user and convert it to usable digital information. Audio codec 860 can likewise generate audible sound for a user, such as through a speaker, e.g., in a handset of device 850. Such sound can include sound from voice telephone calls, can include recorded sound (e.g., voice messages, music files, etc.) and can also include sound generated by applications operating on device 850.

The computing device 850 can be implemented in a number of different forms, as shown in the figure. For example, it can be implemented as a cellular telephone 880. It can also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document can be used. In addition, the logic flows depicted in the figures do not require the particular order shown, or sequential order, to achieve desirable results. Other steps can be provided, or steps can be eliminated, from the described flows, and other components can be added to, or removed from, the described systems. Accordingly, other implementations are within the scope of the following claims.

What is claimed is:

1. One or more computer-readable storage devices storing instructions that, when executed by one or more processing devices, cause a computing system to perform operations comprising:

receiving, from a server system, information that is responsive to each of multiple distinct search queries, wherein the information for each a first search query of the multiple distinct search queries includes a first geographical context being one of a set of locations or a set of areas representing search results of the first search query and the information for a second search query of the multiple distinct search queries is one of a set of locations or a set of areas representing search results of the second search query;

determining a first portion of one of the set of locations or set of areas representing search results of the second query that are geographically relevant to the first geographical context; and displaying on a geographical map:

the first geographical context, and the first portion of the one of the set of locations or the set of areas representing search results of the second query that have been determined to be geographically relevant to the first geographical context.

2. The one or more computer-readable storage devices of claim 1, wherein the operations further comprise:

displaying a user interface element for each of the search queries, wherein the user interface element for each of the search queries, when selected by a user, causes removal from the display of the information for the search query that corresponds to the selected user interface element.

3. The one or more computer-readable storage devices of claim 2, wherein the first geographical context is a route between a starting position and an ending position.

4. The one or more computer-readable storage devices of claim 2, wherein the operations further comprise displaying on the geographical map a visually different style of another portion of the set of locations or set of areas representing the second search results that have not been determined to be geographically relevant to the first geographical context.

5. The one or more computer-readable storage devices of claim 2, wherein the operations further comprise:

receiving user selection of a first user interface element that corresponds to the first search query; and adding to the display, as a consequence of the user selection of the first user interface element, a second portion of the set of locations or set of areas of the second search results.

6. The one or more computer-readable storage devices of claim 5, wherein the operations further comprise:

receiving, after the user selection of the first user interface element, another user selection of the first user interface element; and removing from the display, as a consequence of the another user selection of the first user interface element, the second portion of the set of locations or set of areas of the second search results.

7. The one or more computer-readable storage devices of claim 2, wherein the operations further comprise:

receiving, from the server system, information on a third of the multiple distinct search queries that includes a third geographical context being one of a set of locations or a set of areas representing search results of the third search query;

receiving user selection of a third user interface element that corresponds to the third search query;

removing from a display, as a consequence of the user selection of the third user interface element, at least some of the first portion of the set of locations or set of areas of the second search results; and adding to the display, as a consequence of the user selection of the third user interface element, of a second portion of the second search results that have been determined to be geographically relevant to the third geographical context.

8. The one or more computer-readable storage devices of claim 2, wherein the operations further comprise:

receiving, from the server system, information on a third of the multiple distinct search queries that identifies a third geographical context being one of a set of locations or a set of areas representing search results of the third search query; and displaying, on the geographical map, a second portion of the second search results that have been determined to be geographically relevant to the third geographical context, wherein a third portion of the third search results are not displayed, the third portion of the third search results not having been determined to be geographically relevant to the first geographical context and not having been determined to be geographically relevant to the one of the set of locations or set of areas representing the search results of the second search query.

9. The one or more computer-readable storage devices of claim 8, wherein the operations further comprise:

receiving, from the server system, fourth search results that are responsive to a fourth of the multiple distinct search queries;

receiving user selection of a user interface element that corresponds to the fourth search query; and adding to the display, as a consequence of receiving user selection of the user interface element corresponding to the fourth search query, a first portion of the fourth search results that have been determined to be geographically relevant to the first geographical context, and visual indications of a second portion of the fourth search results that have been determined to be geographically relevant to the one of the set of locations or the set of areas representing the search results of the second query.

10. A computer-implemented method for displaying search results on a map, the method comprising:

receiving, at a computing device and from a server system, information that is responsive to each of multiple distinct search queries, wherein the information for a first search query of the multiple distinct search queries includes a first geographical context being one of a set of locations or a set of areas representing search results of the first query and the information for a second search query of the multiple distinct search queries is one of a set of locations or a set of areas representing search results of the second search query;

determining a first portion of one of the set of locations or set of areas representing search results of the second query that are geographically relevant to the first geographical context: and displaying, by a computing system, on a geographical map:

the first geographical context, and the first portion of one of the set of locations or set of areas representing the search results of the second query that have been determined to be geographically relevant to the first geographical context.

11. The computer-implemented method of claim 10, wherein the method further comprises:

displaying, by the computing device, a user interface element for each of the search queries, wherein the user interface element for each of the search queries, when selected by a user, causes removal from a display of the information for the search query that corresponds to the selected user interface element.

12. The computer-implemented method of claim 11, wherein the first geographical context is a route between a starting position and an ending position.

13. The computer-implemented method of claim 11, further comprising displaying on the geographical map a visually different style of visual indications of another portion of the set of locations or set of areas representing the second search results that have not been determined to be geographically relevant to the first geographical context.

14. The computer-implemented method of claim 11, further comprising:
receiving user selection of a first user interface element that corresponds to the first search query;
adding to the display, as a consequence of the user selection of the first user interface element, a second portion of the set of locations or set of areas of the second search results;
receiving, after the user selection of the first user interface element, another user selection of the first user interface element; and
removing from the display, as a consequence of the another user selection of the first user interface element, the second portion of the set of locations or set of areas of the second search results.

15. The computer-implemented method of claim 11, further comprising:
receiving, from the server system, information on a third of the multiple distinct search queries that includes a third geographical context being one of a set of locations or a set of areas representing search results of the third query;
receiving user selection of a third user interface element that corresponds to the third search query;
removing from the display, as a consequence of the user selection of the third user interface element, at least some of the first portion of the set of locations or set of areas of the second search results; and
adding to the display, as a consequence of the user selection of the third user interface element, a second portion of the set of locations or set of areas of the second search results that have been determined to be geographically relevant to the third geographical context.

16. A computer-implemented method for displaying search results on a map, the method comprising:
receiving, by a server system, multiple distinct search queries that were submitted from a computing device;
providing, by the server system and for receipt by the computing device, information to cause the computing device to display on a geographical map a layer for each of the multiple distinct search queries, a first layer including a geographical context being one of a set of locations or a set of areas representing search results of a first search query of the multiple distinct search queries and a second layer including one of a set of locations or a set of areas representing search results of a second search query of the multiple distinct search queries;
determining, by the server system, a first portion of one of the set of locations or set of areas representing search results of the second query that are geographically relevant to the first geographical context; and
providing, by the server system and for receipt by the computing device, information to cause the computing device to display on the geographical map a visual indication of the first geographical context and a visual indication of the first portion of one of the set of locations or set of areas representing search results of the second query that have been determined to be geographically relevant to the first geographical context.

17. The computer-implemented method of claim 16, further comprising:
providing, by the server system and for receipt by the computing device, information to cause the computing device to display a user interface element for each of the displayed layers, wherein each user interface element causes the computing device to remove, upon user selection of the respective user interface element, the display of the layer that corresponds to the selected user interface element.

18. The computer-implemented method of claim 17, further comprising providing, by the server system and for receipt by the computing device, information for causing the computing device to display on the geographical map a visually different style of another portion of the set of locations or set of areas representing the second search results that have not been determined to be geographically relevant to the first geographical context.

19. The computer-implemented method of claim 17, further comprising providing, by the server system and for receipt by the computing device, information for causing the computing device to add to the display of the geographical map, as a consequence of the computing device receiving user selection of a first user interface element that corresponds to the first search query, a second portion of the set of locations or set of areas representing the second search results, and remove from the display of the geographical map, as a consequence of the computing device receiving another user selection of the first user interface element, the second portion of the set of locations or set of areas representing the second search results.

20. A system for displaying search results on a map, the system comprising:
one or more processing devices; and
one or more computer-readable storage devices storing instructions that, when executed on the one or more processing devices, perform operations comprising:
receiving multiple distinct search queries that were submitted from a computing device;
providing, for receipt by the computing device, information to cause the computing device to display on a geographical map a layer for each of the multiple distinct search queries, a first layer including a geographical context being one of a set of locations or a set of areas representing search results of a first search query of the multiple distinct search queries and a second layer including one of a set of locations or a set of areas representing search results of a second search query of the multiple distinct search queries;
determining a first portion of one of the set of locations or set of areas representing search results of the second query that are geographically relevant to the first geographical context; and
providing, for receipt by the computing device, information to cause the computing device to display on the geographical map a visual indication of the first geographical context and a visual indication of the first portion of one the set of locations or set of areas representing search results of the second query that have been determined to be geographically relevant to the first geographical context.

\* \* \* \* \*